United States Patent [19]

Shirilla

[11] Patent Number: 5,023,757
[45] Date of Patent: Jun. 11, 1991

[54] UMBRELLA TYPE REFLECTOR FOR PHOTOGRAPHIC REFLECTION

[76] Inventor: John Shirilla, 525 McClurg Road, P.O. Box 3365, Youngstown, Ohio 44512

[21] Appl. No.: 357,470

[22] Filed: May 26, 1989

[51] Int. Cl.[5] .......................... G03B 15/02; F21V 7/02
[52] U.S. Cl. ........................................ 362/16; 362/341
[58] Field of Search ................ 362/7, 16, 17, 18, 296, 362/341; 135/33 R; D 3/5, 10

[56] References Cited

U.S. PATENT DOCUMENTS

| | | | |
|---|---|---|---|
| 685,968 | 11/1901 | Brown | 135/33 R |
| 923,542 | 6/1909 | Losey | 362/317 |
| 2,205,860 | 6/1940 | Olds | 362/18 |
| 3,851,164 | 11/1974 | Intrator | 362/18 |
| 4,633,374 | 12/1986 | Waltz et al. | 362/17 |

Primary Examiner—Ira S. Lazarus
Assistant Examiner—Richard R. Cole
Attorney, Agent, or Firm—J. Helen Slough

[57] ABSTRACT

A collapsible light reflector apparatus of the umbrella type having a skeleton frame comprising outer relatively longer ribs and relatively shorter inner ribs adapted to be stretched when the umbrella is in open position, a covering of light reflecting material disposed over the outer ribs completely covering the outer surfaces thereof and a inner covering adapted to completely cover the inner ribs and an inner portions of the outer ribs wherefor the umbrella has a complete covering both on the outer and inner frame surfaces thereof except for covering on the lower part of a rod on which the ribs are mounted providing a covering of all lower surfaces of the upper and lower ribs.

3 Claims, 2 Drawing Sheets 5,023,757

UMBRELLA TYPE REFLECTOR FOR PHOTOGRAPHIC REFLECTION

This invention relates to apparatus in the form of an umbrella for reflecting and diffusing artificial light to enable a photographer to obtain a photograph or other reproduction of a photographic subject..

BACKGROUND OF THE INVENTION

In the past apparatus of an umbrella type has been employed for such purpose as shown in U.S. Pat. No. 3,851,164, which discloses a foldable umbrella-type reflector adjustably supported on a swivel atop a folding tripod stand having a vertically telescoping vertical pole, tne umbrella having, as in conventional umbrella as, a central shaft, a set of long ribs, which when the umbrella is opened, are curved, and straight when in folded position, a set of short rios or struts, a fabric cover of flexible reflective material is fixed by a fixed ring at the top of tne shaft to the upper ends of tne long ribs of the said cover. The cover comprises identical panels in tne general shape of an isosceles triangle which panels are sewn together along their edges and attached by separate loops to the outer ends of each of tne long ribs. Each of tne snort ribs is pivotally attached to a slide ring on tne pole and at its other end to an intermediate point on a long rib.

When the umbrella :s opened and exposed to view and one looks axially into the mouth of the umbrella, it will be seen that light is reflected from a light source mounted at an axial level within the covering and diverted and/or obstructed by the said short ribs or struts creating separate visible bands of light.

Similar umbrella type diffusing apparatus are shown in U.S. Pat. Nos. 923542; 3,870,874; 3,873,821; 4,443,837. In U.S. Pat. No. 1,205,860 an umbrella having only long ribs is shown having an outer covering therefor. The ribs are provided either inside or outside of tne cover since the function, as stated optionally, is purely mechanical to cause distention of tne reflector and permitting it to be collapsed.

OBJECTS AND SUMMARY OF THE INVENTION

It is an object to the invention to provide light reflecting and diffusing apparatus of the so-called "umbrella" type for pnotographing objects wherein light reflecting surfaces uniformly cover both the long and short ribs or the skeletal structure of the umbrella whereby lighting from an external light source is reflected by the umbrella covering to attain superior photographic images unimpaired by any obstruction of the reflected light reflected. A complete covering of light reflecting material for both the relatively shorter inner ribs and the longer outer ribs is thus provided. In this invention an exterior light reflecting collapsible cover is secured to foldable outer ribs and a light reflecting inner cover is provided which is adapted to cover the relatively shorter ribs and stays or struts, said inner cover being secured to the outer peripheral ends of the relatively longer outer ribs and adapted to be enclosed thereby when tne umbrella is closed by folding the same. The said inner cover is preferably provided with panels each comprising a triangularly shaped portion adapted to terminate in crown surrounding positions, and with a trapezoidal shaped portion which trapezoidal portion is secured to outer ends of the shorter ribs and seamed to adjacent panels and secured as by loops or tne like to the outer ends of the longer ribs. Another object of the invention is to provide an umbrella type reflector which is highly efficient in use an inexpensive to manufacture.

These and other objects and advantages will become apparent as disclosed in the appended specification and claims, reference being made to the accompanying drawings forming part thereof, and wherein like parts thereof are designated by like reference characters.

Figure 1:
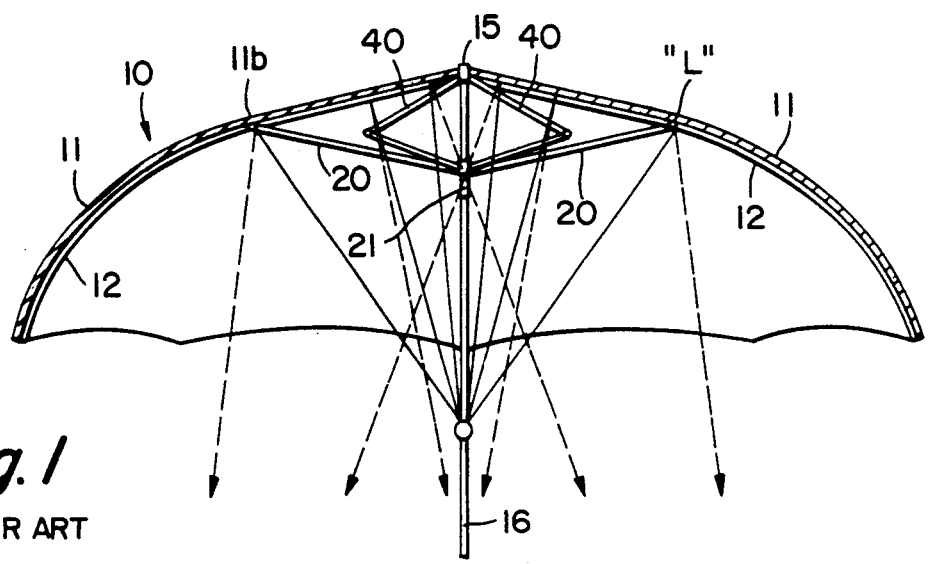
FIG. 1 is a cross sectional view of a conventional umbrella type reflector of the prior art showing the rays reflected therefrom.

Referring now to the drawings, in all of which like parts are designated by like reference characters, as stated above, in FIG. 1 is shown an umbrella or conventional design used for reflecting and diffusing or "bouncing" light delivered thereto by a beam from a light source (not shown), for photographic purposes. The frame has a fabric covering 11 of light reflective material such as aluminum foil, yarn, or the like, which covering is secured to a plurality of outer ribs 12 of resilient or spring material of a preferred length. When the umbrella is in an open position, the said ribs are distended and are curved. The ribs 12 as shown are attached to a center crown 15 carried at an upper end of a rod or shaft 16, and the umbrella is provided with inner ribs or struts 20 further secured to the rod by means of a slide ring 21. Said inner ribs extend a lesser extent and are relatively snorter than the outer ribs 12. In the prior art shown in FIG. 1 the inner ribs or struts 20 are uncovered and are adapted to be secured to a slider 21 telescoped over the shaft 16 and secured at their outer ends to intermediate portions 11b, of the outer ribs and are adapted to be raised or lowered and folded inwardly when folding the umbrella or spread when raised on tne rod for opening the same.

Figure 2:
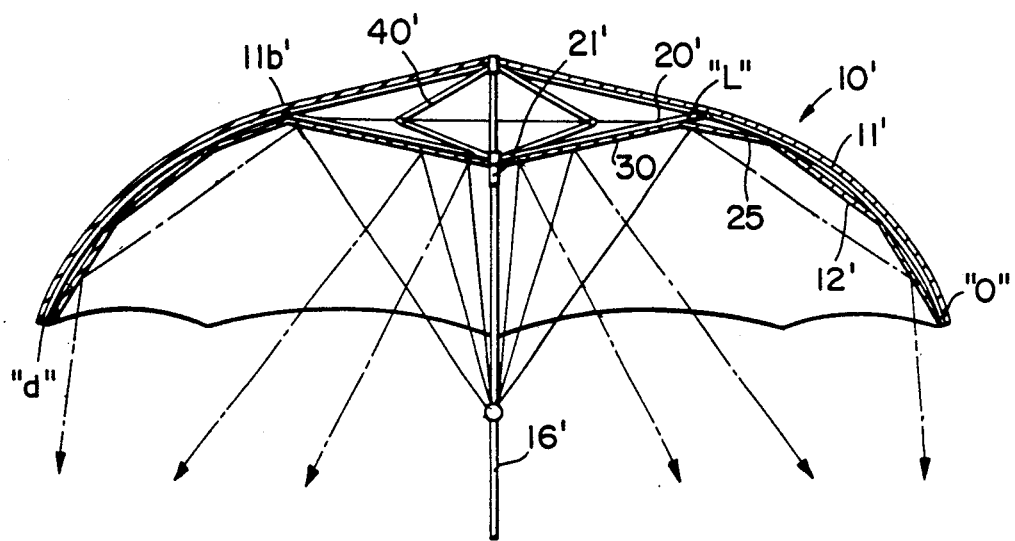
FIG. 2 is a view similar to that of FIG. 1, showing an embodiment of this present invention and showing the reflected rays from the reflector covering the inner ribs.
Figure 3:
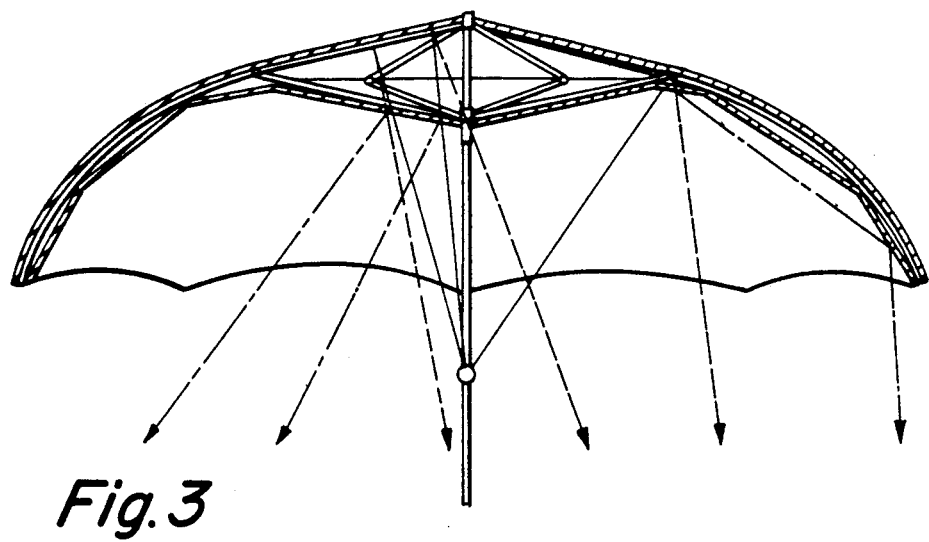
FIG. 3 is a view similar to FIG. 2, showing a combination of both conventional reflected rays and rays reflected from the inner cover.
Figure 4:
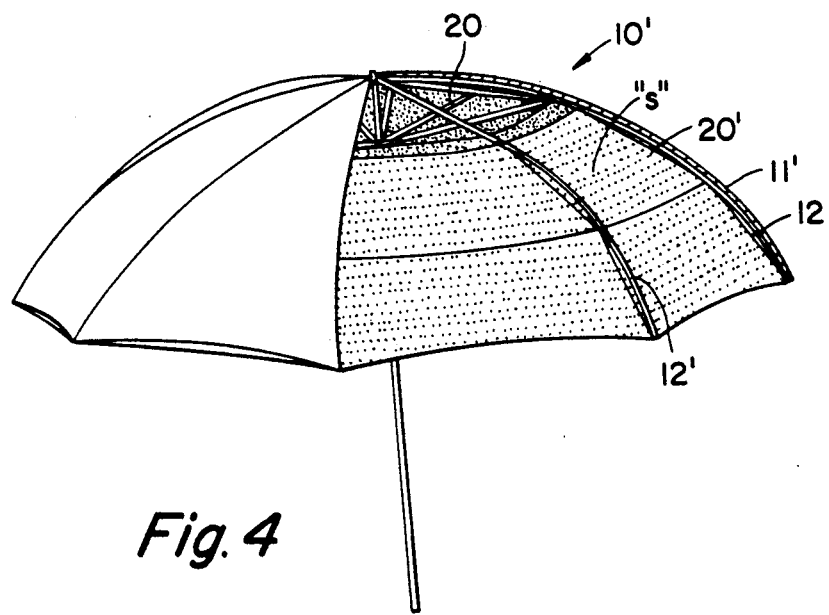
FIG. 4 is a perspective view of apparatus embodying the invention, a portion of the outer covering being removed for purposes of clarity.
Figure 5:
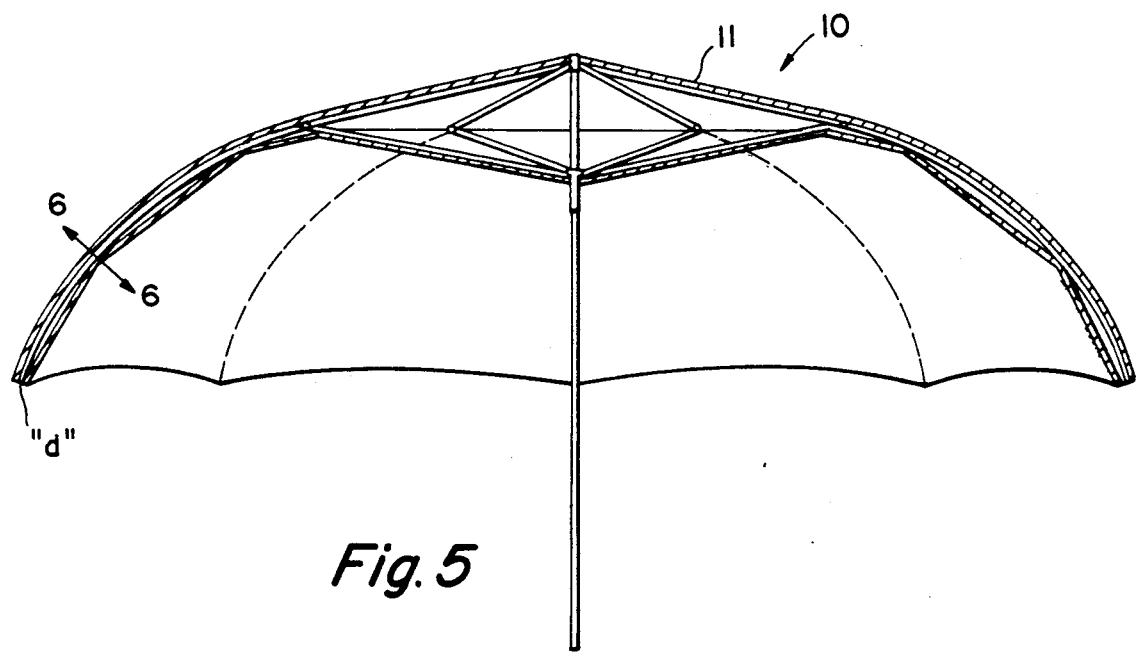
FIG. 5 is a sectional view of the umbrella of FIG. 4.
Figure 6:
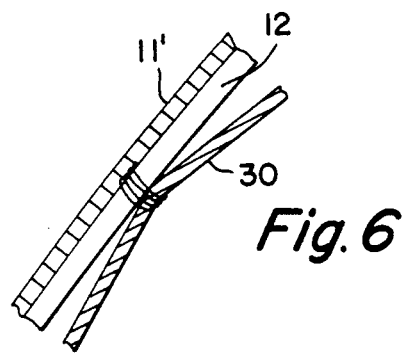
FIG. 6 is a view taken on the line 6-6 of FIG. 5, showing the securing of tne inner cover to portions of the outer rib.

It will be noted that, in the form or the present invention shown in FIGS. 2, 3, 4, 5, 6, inclusive, the said inner ribs or struts are provided with a covering of like reflective material 30, said covering the relatively shorter struts 20' and intervening spaces "s" between the struts 20, the inner struts being secured to an intermediate portion as shown at "s" of the outer ribs 12 and the downwardly extending portions "d'" of the longer ribs as shown at "o" are secured thereto by loops or the like as shown in FIG. 6. It will be noted further that, as best shown in FIGS. 2, 3, and 5, "The covering pieces for the spacing between the struts 20 are triangular in form and terminate in coverage at the crown 15 of the umbrella to cover the inner ribs or struts 20, said covering pieces are secured to trapezoidal pieces 30 as best shown in FIGS. 2, 3, 4, and secured to downwardly extending ends of the outer ribs and seamed to adjacent panels secured as by loops, shown in FIG. 6, to the outer ends of the relatively longer ribs as referred to above.

It will be noted from the drawings that light from the light source is reflected as shown from the inner covering for the relatively shorter and longer ribs as shown in FIGS. 2 and 3 and the ribs do not obstruct direct light towards the reflective surface nor do the ribs obstruct light being reflected away from the reflective surface. The invention eliminates the rib construction in the "catch" lights, the catch light being the exact image of the light source which appears in a subjects eyes or on photographed objects having a mirror like surface.

In the form of this invention, the umbrella is provided with stays 40 mounted on the upper portions of the rod or shaft adapted to space and maintain the inner struts or ribs of the skeletal frame in spaced relation to the relatively longer ribs As shown in FIG. 5 when the umbrella is open they provide surfaces which the ribs contact upon stretching of the same and permit the collapse of the inner and outer ribs when the umbrella is folded. Although I have shown a covering for the outer ribs it is to be understood that the covering for the inner ribs could be the only cover employed in the umbrella. The outer cover in essence acts as a light blocking device for translucent inner covers and adds a clean cosmetic look.

While I have described my invention in connection with a preferred embodiment it will be understood that numerous and extensive departures may be made therefrom such as structural changes in the skeletal structure without however departing from the spirit of the invention and the scope of the appended claims.

What I claim is:

1. A light reflector apparatus of the umbrella type for utilization of a light source to produce indirect lighting of images as employed in photography, the apparatus comprising a skeleton frame having an array of relatively long outer ribs and inner relatively shorter ribs and stays, an inner covering of light reflecting material covering the surface of said inner ribs and stays, means for securing said covering to both inner ribs and stays and said outer ribs whereby light from an external source is reflected by the inner covering of the photograph umbrella skeletonal frame.

2. A light reflector or apparatus as claimed in claim 1 wherein the said outer ribs are adapted to be curved and said inner ribs are adapted to keep the outer ribs in open or closed position.

3. A light reflector apparatus as in claim 1 having a separate covering of inner and outer ribs and stays wherefore light from an external source is adapted to be substantially reflected by the same.

* * * * *

UNITED STATES PATENT AND TRADEMARK OFFICE
CERTIFICATE OF CORRECTION

PATENT NO. : 5,023,757

DATED : June 11, 1991

INVENTOR(S) : John Shirilla

It is certified that error appears in the above-identified patent and that said Letters Patent is hereby corrected as shown below:

Column 1, Lines 16, 21 (2 places), 22, 41, 63, please change "tne" to --the--.

Column 1, Line 17, delete "as".

Column 1, Line 19, delete "rios" and insert therein --ribs--.

Column 1, Line 26, delete "snort" and insert therein --short--.

Column 1, Line 29, delete ":s" and insert therein --is--.

Column 2, Lines 1, 26, change "tne" to --the--.

Column 2, Line 4, delete "an" and insert therein --and--.

Column 2, Line 8, between "forming" and "part", please insert --a--.

Column 2, Line 30, after "umbrella" insert --10--.

Column 2, Line 44, change "snorter" to --shorter--.

UNITED STATES PATENT AND TRADEMARK OFFICE
CERTIFICATE OF CORRECTION

PATENT NO. : 5,023,757

DATED : Jun3 11, 1991

INVENTOR(S) : John Shirilla

It is certified that error appears in the above-identified patent and that said Letters Patent is hereby corrected as shown below:

Column 2, Line 52, delete "or" and insert therein --of--.

Signed and Sealed this

Sixth Day of October, 1992

Attest:

DOUGLAS B. COMER

*Attesting Officer*  *Acting Commissioner of Patents and Trademarks*